(12) United States Patent
Lekutai (10) Patent No.: US 7,831,245 B1
(45) Date of Patent: Nov. 9, 2010

(54) BLIND MOBILE-TO-MOBILE NUMBER SEARCH

(75) Inventor: Gaviphat Lekutai, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 593 days.

(21) Appl. No.: 11/422,813

(22) Filed: Jun. 7, 2006

(51) Int. Cl.
*H04M 3/42* (2006.01)
*H04W 24/00* (2009.01)

(52) U.S. Cl. .................................. 455/414.1; 455/456.1

(58) Field of Classification Search .............. 455/456.1, 455/456.2, 456.3
See application file for complete search history.

(56) References Cited

U.S. PATENT DOCUMENTS

2002/0128004 A1* 9/2002 Kanerva ...................... 455/422
2006/0052112 A1* 3/2006 Baussi et al. .............. 455/456.1
2006/0256959 A1* 11/2006 Hymes ................... 379/433.04

* cited by examiner

*Primary Examiner*—Vincent P Harper
*Assistant Examiner*—Omoniyi A Obayanju
(74) *Attorney, Agent, or Firm*—Moazzam & Associates, LLC (57) ABSTRACT

Wireless user equipment in possession of a user can be identified (e.g., by its telephone number) based upon observations or knowledge of another such user. Information associated with one of a first user and second user, such as a telephone number, can then be provided to the other. For example, a first user who observes a second user may wish to know the number of the second user's mobile phone without asking the second user for his or her number. The second user's number can be determined by estimating the location of the second user based upon the first user's location and the first user's observations about the second user, and identifying any user equipment at the estimated location.

13 Claims, 7 Drawing Sheets

FIG. 1

| | |
|---|---|
| OTHER PERSON IS LESS THAN 10 FEET AWAY FROM ME | ✓ |
| OTHER PERSON IS 10-50 FEET AWAY FROM ME | ✓ |
| OTHER PERSON IS 50-100 FEET AWAY FROM ME | ✓ |
| OTHER PERSON IS MORE THAN 100 FEET AWAY FROM ME | ✓ |
| OTHER PERSON IS MOVING AWAY FROM ME | ✓ |
| OTHER PERSON IS MOVING TOWARD ME | ✓ |
| OTHER PERSON IS WALKING | ✓ |
| OTHER PERSON IS IN A MOVING VEHICLE ON A LOCAL STREET | ✓ |
| OTHER PERSON IS IN A MOVING VEHICLE ON A HIGHWAY | ✓ |
| I KNOW THE NAME(S) OF THE STREET(S) THE OTHER PERSON IS ON | ✓ |
| THE OTHER PERSON IS USING THE PHONE | ✓ |
| I CAN SEE WHAT BRAND OF PHONE THE OTHER PERSON HAS | ✓ |

FIG. 2A

FIND MOST LIKELY PHONE NUMBER ✓

FIND 1-5 MOST LIKELY PHONE NUMBERS ✓

FIND 5-10 MOST LIKELY PHONE NUMBERS ✓

FINAL ALL LIKELY PHONE NUMBERS ✓

BLIND MOBILE-TO-MOBILE NUMBER SEARCH

BACKGROUND OF THE INVENTION

1. Field of the Invention

The present invention relates generally to location-based services in wireless telecommunication networks and, more specifically, to identifying subscribers' telephones based upon their location.

2. Description of the Related Art

The situation often arises where one may observe another person or persons about whom it is desired to discretely obtain or provide information to facilitate solicitation, investigation or surveillance. For example, a salesperson or marketing agent may see a person or group of persons whom the salesperson would like to solicit at a later time because they presently may be in a social or business setting in which the salesperson would prefer not to disturb them. Similarly, one may see someone to whom he or she is attracted but would prefer to defer attempting to contact that person until a later time. It is not uncommon for a person whom another wishes to contact to be talking on the telephone at the time, engaged in conversation, working, driving in a car, or otherwise preoccupied. Thus, it would be desirable to enable a person observing another whose contact information (e.g., name, address, telephone number) is not known to contact the other at a more convenient or otherwise preferable time. The present invention addresses these problems and others in the manner described below.

SUMMARY OF THE INVENTION

In one aspect, the present invention relates to identifying a user in possession of wireless user equipment (also referred to as a mobile station, mobile phone, cell phone, etc.) based upon observations or knowledge of another such user. In another aspect, the invention relates to providing information associated with one of a first user and second user to the other based upon such observations or knowledge of the first user. For example, a first user who observes a second user may wish to know the telephone number of the user equipment (UE) in the possession of the second user without asking the second user for his or her telephone number.

In an exemplary embodiment of the invention, when a request is received from the UE in possession of a first user ("first user UE"), identification information included in the request is used to attempt to identify the second user UE. The identification information includes location-based information observed or otherwise known by the first user that describes a relative location of the second user UE with respect to the first user UE. For example, the first user can provide an estimate of the distance between the first and second users, the direction in which the second user is moving (if not stationary), and the speed with which the second user is moving (if not stationary). The identification information can further include other information, such as an indication of whether the second user UE is idle, i.e., not involved in a telephone call or other such telecommunication, or actively in use by the second user. The identification information can also include any suitable additional information that the network can use to help identify the second user UE.

The identity of the second user UE can be determined by estimating its geographic location based upon the location-based information and the geographic location of the first user UE, and then comparing the estimated geographic location with the locations of UE's registered in the network at that time. The geographic locations can readily be determined by any suitable method, such as by use of the Assisted Global Positioning System (A-GPS).

Once the network has identified the second user UE, the network can provide information associated with one of the first user and second user to the other. For example, the network can provide the telephone number of the second user UE to the first user UE. Alternatively, the network can provide the telephone number of the first user UE to the second user UE. In this manner, the user receiving the other's telephone number can, for example, choose to call the other at a later, more preferable time.

DETAILED DESCRIPTION

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention.

Figure 1:
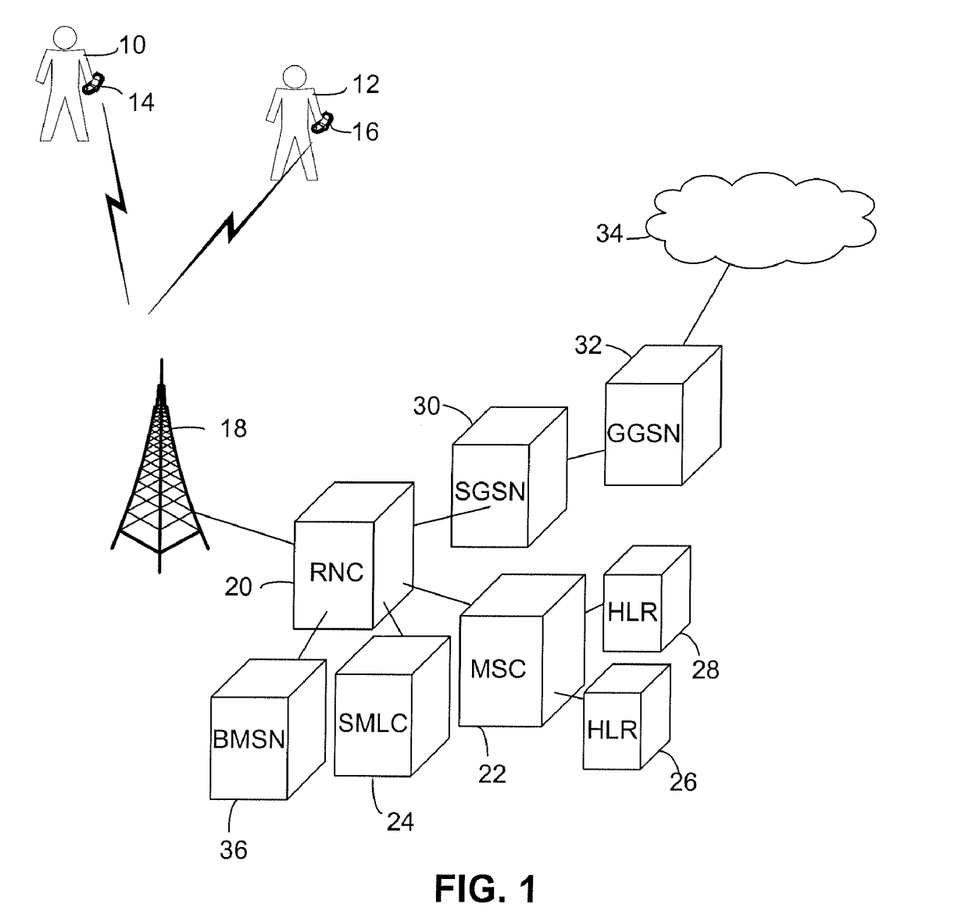
FIG. 1 is an architecture diagram of an exemplary embodiment of a wireless telecommunication network that identifies users to each other in accordance with the present invention.

As illustrated in FIG. 1, in an exemplary embodiment of the invention a wireless telecommunication system enables a first user 10, second user 12 and others to communicate with each other (and with still others through external networks such as the Public Switched Telephone Network and packet-switched networks) by placing and receiving telephone calls, sending and receiving text messages, and so forth, on their user equipment (UE) 14 and 16, respectively, in the manner of a conventional (cellular) system. Although the architecture of the system illustrated in FIG. 1 is generally in accordance with that of the Global System for Mobile communication (GSM) and Universal Mobile Telecommunications (UMTS) standards, in other embodiments of the invention it can be structured in accordance with any other suitable wireless telecommunication standard.

In the exemplary embodiment, the present invention addresses a scenario in which first user 10 observes second user 12 and wishes to obtain the second user's telephone number, i.e., the telephone number associated with UE 16 that is in the possession of second user 12, without asking second user 12 for the telephone number or knowing the identity of second user 12. Conversely, the invention also can be used in a situation in which first user 10 wishes to provide second user 12 with the first user's telephone number, i.e., the telephone number associated with UE 14 that is in the possession of first user 10. Although in the exemplary embodiment the information that is provided to a user is a telephone number, in other embodiments it can comprise any other suitable information. For example, a law enforcement officer following a suspect can cause a text message to be transmitted to an unknown bystander's phone, requesting the bystander to discretely leave the area. In the manner described below, the network identifies the second user's UE 16 based solely upon observations of first user 10, without the benefit of being able to simply look up the second user's telephone number or other identifying information, i.e., blindly.

In accordance with the GSM/UMTS architecture, the network includes a number of base stations 18 (referred to as a NODE-B in the lexicon of UMTS), each in communication with a Radio Network Controller (RNC) 20. The RNC 20 is, in turn, in communication with a Mobile Switching Center (MSC) 22 and a Serving Mobile Location Center (SMLC) 24. A Visitor Location Register (VLR) 26 and Home Location Register (HLR) 28 can be integral with MSC 22 or, as shown, separate elements. The RNC 20 is also in communication with packet-switched elements, including a Serving General Packet Radio Service (GPRS) Support Node (SGSN) 30 and a Gateway GPRS Support Node (GGSN) 32. The GGSN 32 is in communication with elements external to the illustrated telecommunications network via a packet-switched network 34. These elements and their operation are well-known in GSM/UMTS wireless telecommunication networks and are therefore not described in further detail herein. Note that although only one base station 18 is illustrated for purposes of clarity, persons skilled in the art to which the invention relates will appreciate that such systems typically include many others.

In addition to the conventional network elements, the network includes a novel Blind Mobile Search Node (BMSN) 36. Although not shown for purposes of clarity, BMSN 36 includes one or more processors, memories and associated logic, input/output logic, and other hardware and software elements (which may collectively be referred to herein as "logic") of the types commonly included in nodes of a telecommunication system or similar system that perform computations and similar processing. In cooperation with the other elements, BMSN 36 carries out or controls the steps described below of responding to a user request to identify another user. Nevertheless, in other embodiments some or all of those functions or steps can be performed by other elements, such as software processes (not shown) operating on MSC 22, SMLC 24, etc. Portions of the functionality can be included in an applet operating on the user equipment itself or in other elements (not shown) external to the network.

Figure 2A:
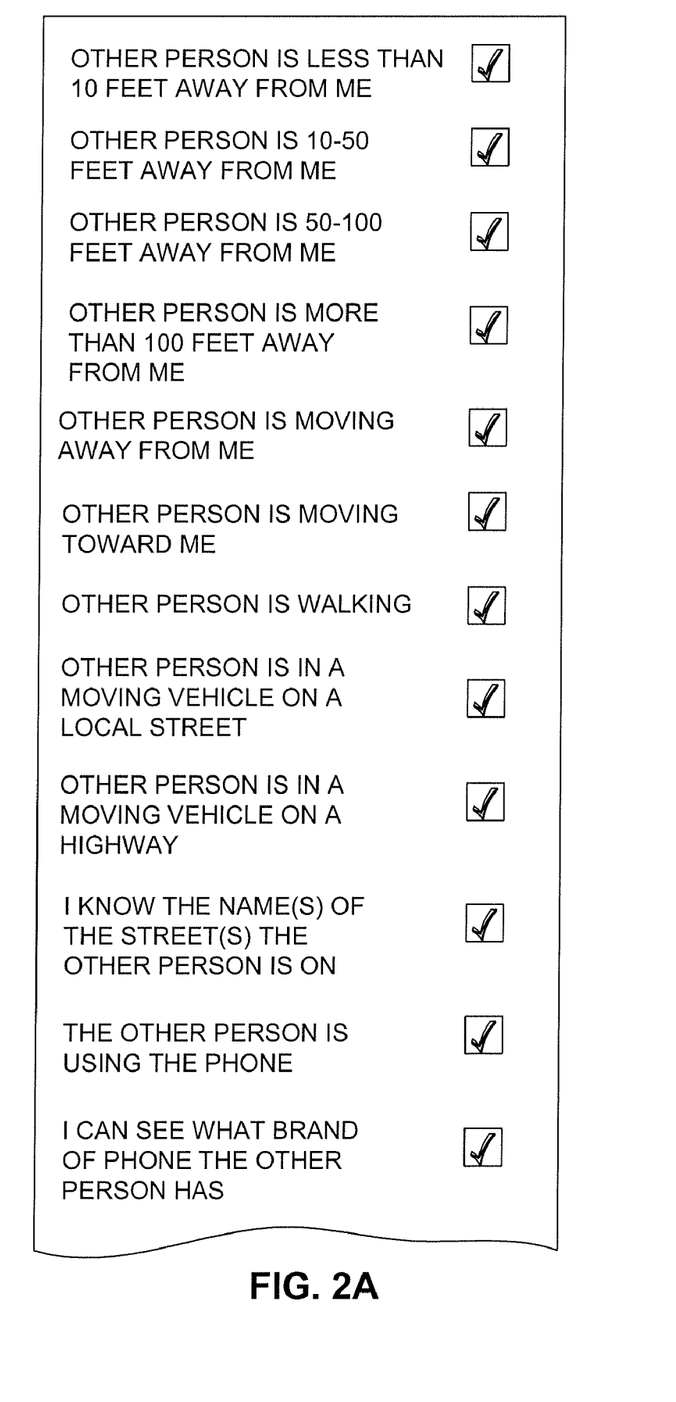
FIG. 2A illustrates an exemplary screen display on a wireless phone or other user equipment in the embodiment shown in FIG. 1.
Figure 2B:
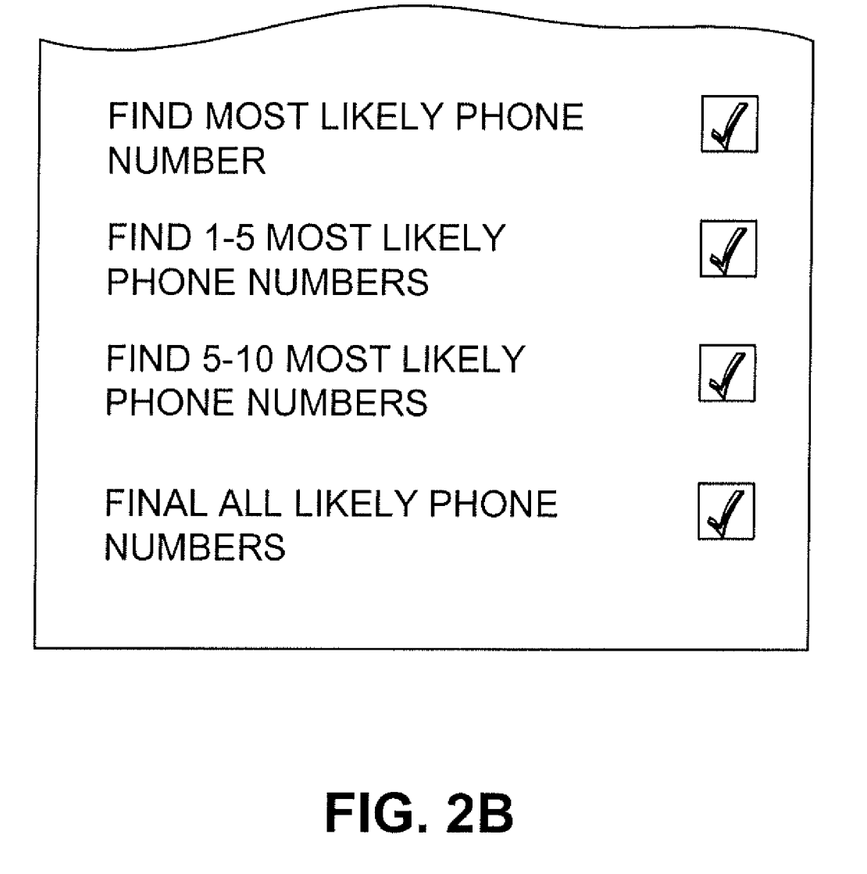
FIG. 2B is a continuation sheet of FIG. 2A.

In the operational scenario, first user 10 activates a software application (applet) on his or her UE 14. As noted above, a portion of the functionality of the system may be included in the applet and another portion in BMSN 36 or other elements. Persons skilled in the art will understand how, by programming or configuring such elements, to distribute and embody the functionality in a manner that effects the methods described herein. In any event, in the exemplary embodiment of the invention, the system causes the menu illustrated in FIG. 2 to be displayed on the first user's UE 14.

The menu solicits the following exemplary identification information about second user 12 or his or her UE 16. The information includes the distance between users 10 and 12 and can be solicited by providing a convenient number of ranges from which the user can choose an estimate: Whether second user 12 is less than 10 feet from first user 10, between 10 and 50 feet from first user 10, between 50 and 100 feet from first user 10, or more than 100 feet from first user 10. (Note that although the English units of feet are displayed in this exemplary embodiment to aid comprehension by North American users, units can be metric in other embodiments or can be user-selectable.) The information also includes whether user 12 is stationary and, if not, the relative direction of second user 12 with respect to first user 10, such as toward and away. In other embodiments, the direction could comprise a bearing or a direction with respect to a street or landmark. The information also includes the relative speed of user 12 with respect to user 10. Speed can be solicited by displaying a choice of categories: Whether second user 12 is a pedestrian or in a vehicle, and whether the vehicle is moving at a typical speed for a local, surface street or at typical highway speeds. The information can also include the name of a street, intersection or other place where user 12 was observed or believed to be located. Although only a checkbox is shown in FIG. 2, in which first user 10 indicates whether he or she is aware of such a location, this menu can lead to a sub-menu that allows first user 10 to enter a street name or select from a menu of names. Indeed, in other embodiments such sub-menus can be used to input quantities such as speed and direction instead of providing a menu of choices as described above. The identification information can further include information that is not location-based but which can help identify UE 16, such as whether user 12 is talking on the telephone, i.e., whether UE 16 is active or idle. The identification information can also include the brand and model of UE 16 if first user 10 is able to observe it. Although only a checkbox is shown, in which first user 10 indicates whether he or she is aware of a brand or model, this menu can lead to a sub-menu that allows first user 10 to enter a model or brand name or select from a menu of names. Additional identification information that may be useful in other embodiments of the invention will readily occur to persons skilled in the art to which the invention relates in view of these teachings.

The menu also solicits the number of candidates to be returned. For example, if user 10 checks a box for "Find Most Likely Phone Number" the system identifies only the one candidate that is most likely UE 16 and returns its telephone number (or, in other embodiments, other associated information). If the user checks a box for "Find 1-5 Most Likely Phone Numbers" the system identifies at least one but no more than the five most likely candidates. If the user checks a box for "Find 5-10 Most Likely Phone Numbers" the system identifies at least five but no more than the ten most likely candidates. If the user checks a box for "Find All Likely Phone Numbers" the system identifies all of the candidates that have greater than some predetermined likelihood of being UE 16. This feature can be useful in a situation in which user 10 desires to obtain the phone numbers of a group of people. User 10 can enter identification information pertaining to any one of them and request, for example, 5-10 phone numbers. The system would then search for at least five but as many as ten candidates who best match the identification information as described below.

After first user 10 has checked off any applicable boxes and indicated completion of the menu (by, for example, pressing a button on UE 14), UE 14 transmits the entered information to the network. The information is received by RNC 20, which forwards it to BMSN 36. BMSN 36 responds to the information in the manner described below. Note that in embodiments in which sub-menus are presented, the information in the menu can trigger the presentation of a sub-menu. After the identification information has been input in this manner, the method illustrated by the flow diagram of FIG. 3 is used to identify UE 16 and provide associated information, such as the telephone number of UE 16.

Although in the exemplary embodiment of the invention the identification information is input into UE 14 using a menu, in other embodiments in can be input in any other suitable manner, such as by following voice prompts. Spoken words that are input can be translated to textual information using a suitable speech-to-text translation system.

Figure 3A:
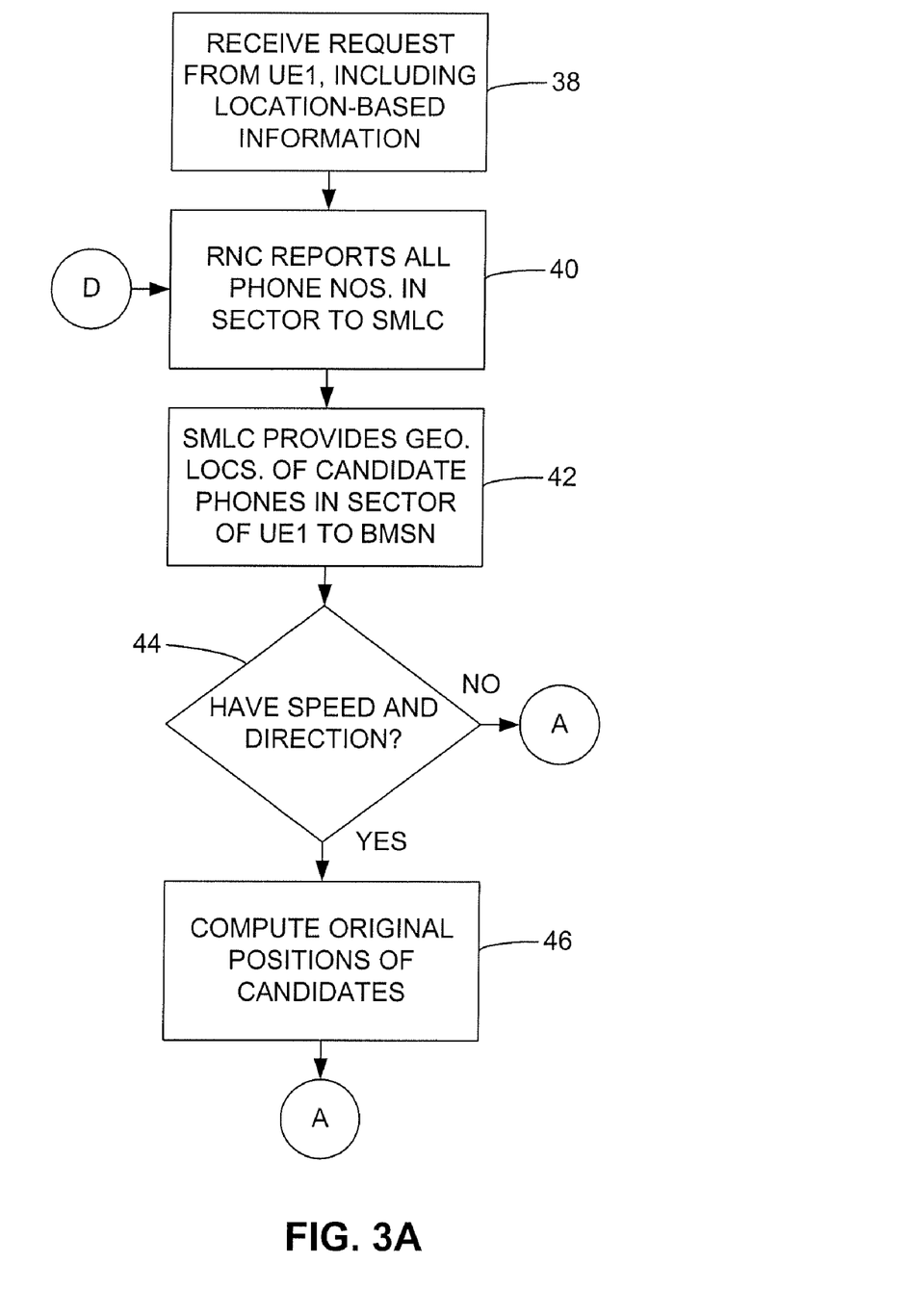
FIG. 3A is a flow diagram illustrating an exemplary method of operation of the system shown in FIG. 1.
Figure 3B:
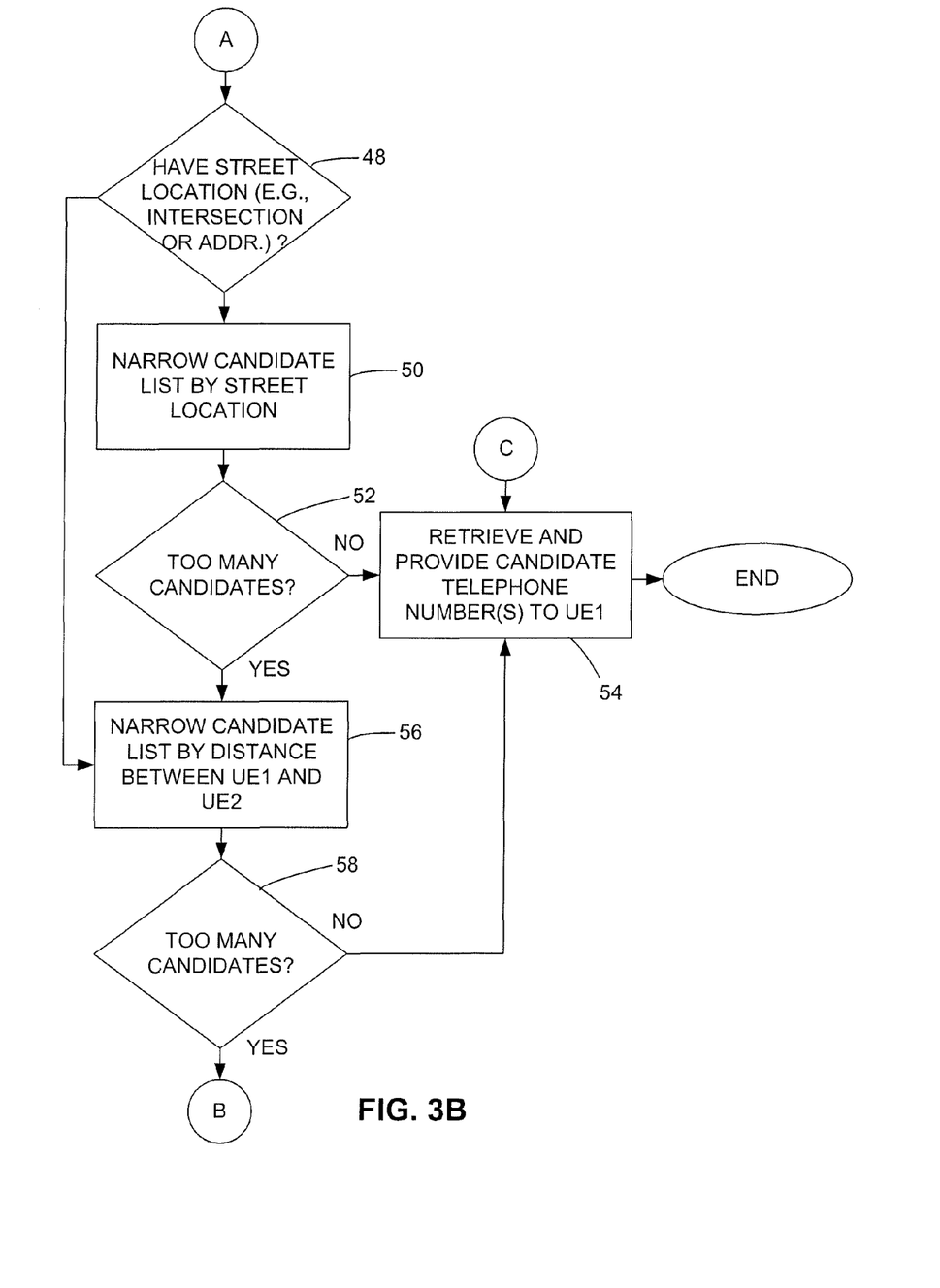
FIG. 3B is a continuation of the flow diagram of FIG. 3A.
Figure 3C:
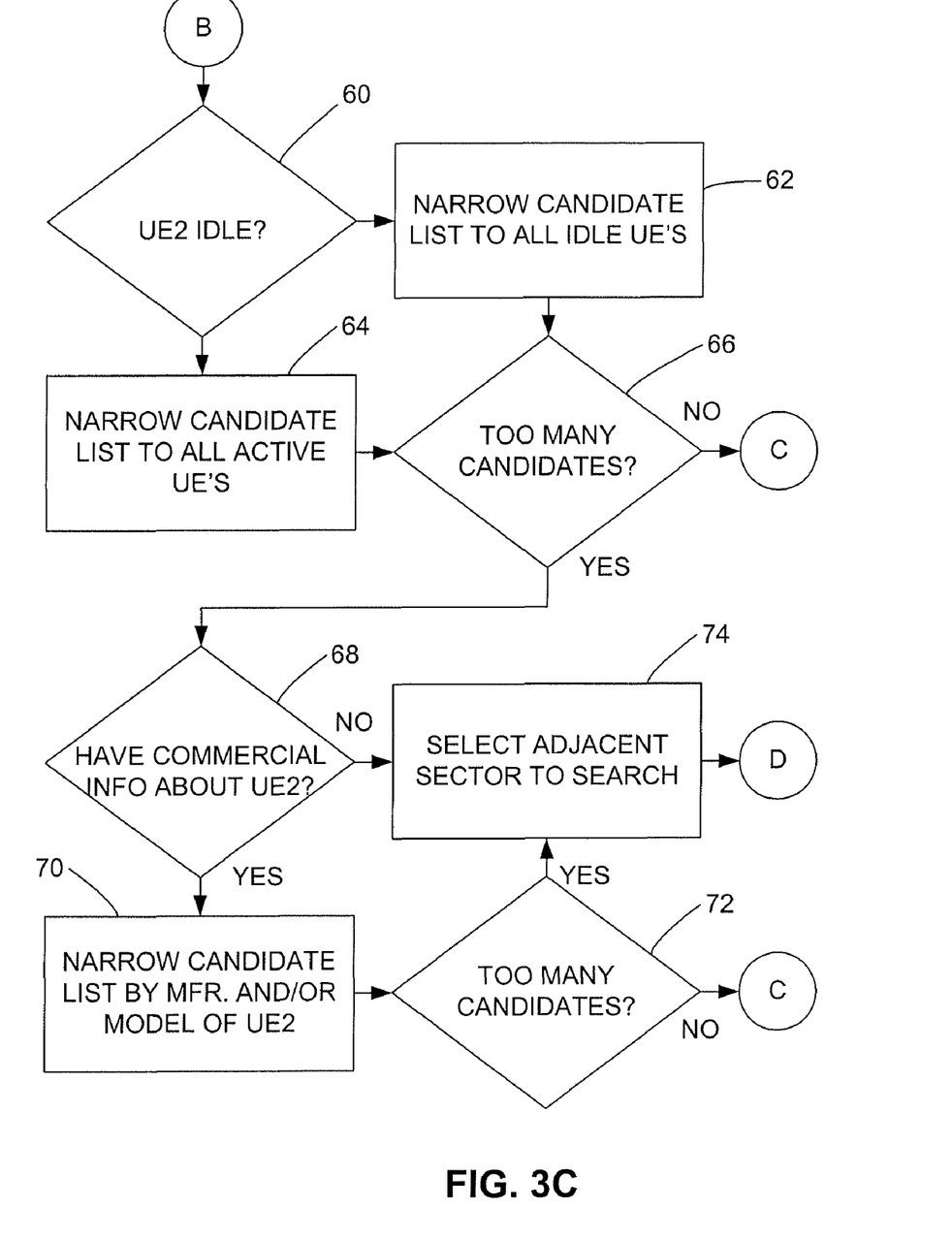
FIG. 3C is a continuation of the flow diagram of FIGS. 3A-B.
Figure 4:
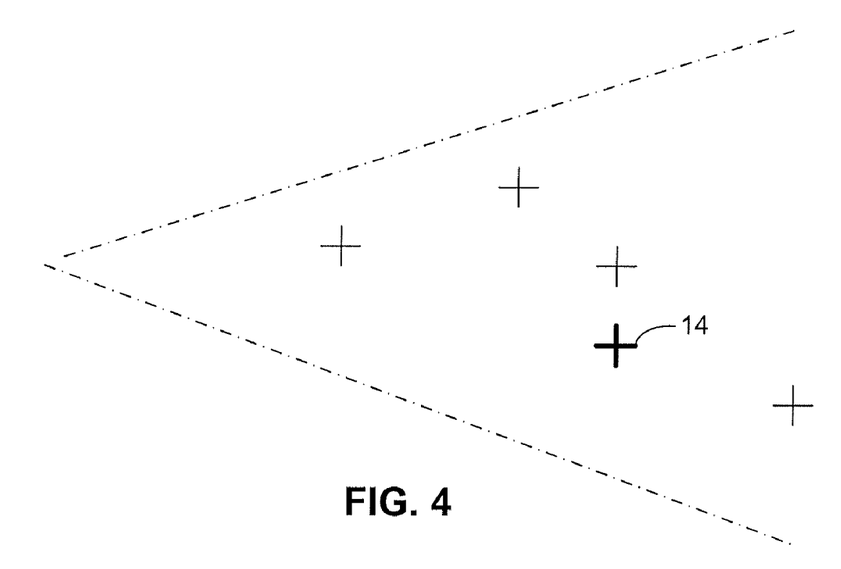
FIG. 4 illustrates a base station sector in the wireless telecommunication network shown in FIG. 1 in which a number of candidate phones or other user equipment are present.

As illustrated in FIG. 3, at step 38 BMSN 36 gathers the above-described identification information, including the location-based information (e.g., distance, speed, direction, etc.) and any other useful information. At step 40 BMSN 36 obtains from RNC 20 the telephone numbers of all user equipment operating in the same sector in which the first user's UE 14 is located. As known in the art, a sector is a portion of the region covered by a base station. There are typically three or six wedge-shaped or sector-shaped regions of radio coverage extending from a base station, each served by a set of antennas (not shown). At step 42, BMSN 36 causes SMLC 24 to provide the corresponding geographic locations of the UE's in the sector reported by RNC 20. As known in the art, one function of a conventional SMLC is to keep track of the geographic locations of UE's registered in the network. It can determine geographic location in any suitable manner, such as by using A-GPS. As the operation of A-GPS and SMLC's are well known, they are not described in further detail herein. Referring briefly to FIG. 4, these locations are indicated symbolically by plus signs ("+"), with the location of UE 14 in boldface. The user equipment at those locations form a set of candidates from which UE 16 can generally be identified. Although not shown in FIGS. 3A-C for purposes of clarity, if the number of candidates in this set is within the range that user 10 input as being desired, the search can stop at this point, and the system can transmit the telephone numbers of the UE's in the candidate set to UE 14.

Figure 5:
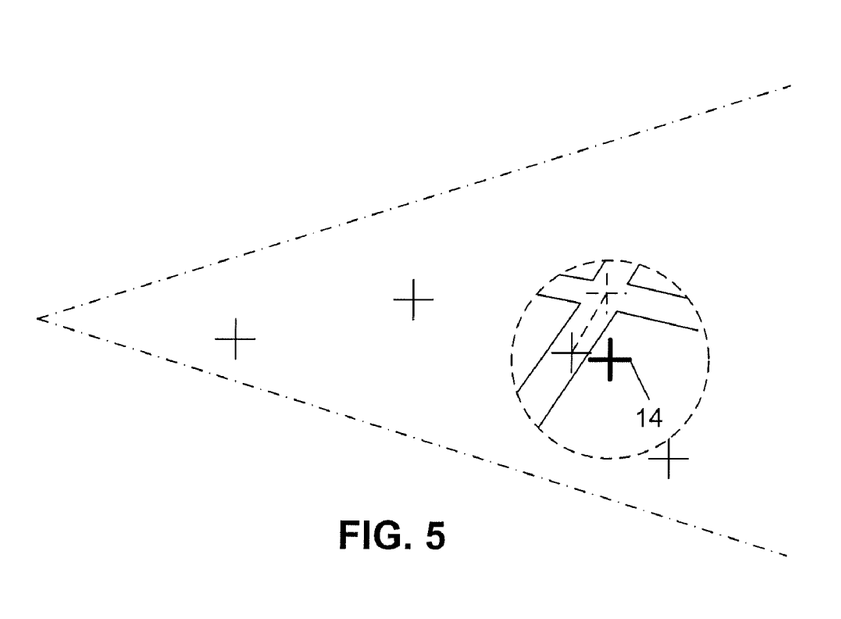
FIG. 5 is similar to FIG. 4, illustrating the effect of narrowing the number of candidate phones.

As indicated by step 44, if an estimated speed and direction have been input, BMSN 36 uses this information at step 46 to compute the original or former locations for each UE in the candidate set. In other words, BMSN 36 computes the location at which each UE whose location was determined at step 42 would have been disposed at the time user 10 input the information if those UE's were traveling in the estimated direction at the estimated speed for a predetermined time interval or delay. The locations shown in FIG. 5 represent the computed locations. Note that the location of the first user's UE 14 is not computed because it is presumed in the exemplary embodiment of the invention that UE 14 is stationary; only the locations of other UE's in the sector are computed. Other embodiments can allow a user to enter his own speed and direction. After the locations have been computed, or if speed and direction information are not available, or if it was indicated that UE 12 and UE 14 are stationary, the set of candidates can be further narrowed based on other information.

As indicated by step 48, if a street location has been input, BMSN 36 uses this information at step 50 to determine whether any of the candidate UE's are located at that street location. A street location can be input in the form of an address, a single street name, an intersection of two streets, etc. Referring briefly to FIG. 5, an intersection is shown enclosed in the dashed-line circle, centered on the location of UE 14. Note that the computed location of one of the UE's is adjacent UE 14, indicating that it was located there at approximately the time that first user 10 entered the information. (A dashed line illustrates its computed movement.) The list of candidates can be narrowed to only those UE's that were within some predetermined distance of UE 14 at the time that first user 10 entered the information. For example, it can be narrowed to all UE's within fifteen feet of UE 14. Although not shown for purposes of clarity, BMSN 36 can include pre-stored street map information for purposes of step 50, or retrieve such information in operation (i.e., on the fly) from a suitable network source.

At step 52, BMSN 36 determines the number of candidates remaining in the narrowed set. If the number of candidates is within the range that user 10 input as being desired, then at step 54 BMSN 36 causes RNC 20 to transmit its telephone number (or, in other embodiments of the invention, any other suitable associated information) to the first user's UE 14, as that candidate is most likely the second user's UE 16.

If there are multiple candidates remaining, then at step 56 BMSN 36 further narrows the candidate list by eliminating all candidates located at a distance from UE 14 outside the input distance range. For example, if first user 10 indicated that second user 12 was between 50 and 100 feet away, BMSN 36 eliminates from the candidate set all UE's at distances from UE 14 not within that range. At step 58, BMSN 36 again determines the number of candidates remaining in the narrowed set. If the number of candidates is within the range that user 10 input as being desired, then they are identified as the most likely candidates, and step 54 is performed as described above.

If there are more candidates remaining than desired, then at step 60 BMSN 36 determines which of the candidates are idle and which are active, i.e., being used. If user 10 indicated that user 12 was not talking on the phone or otherwise using UE 16, then at step 62 BMSN 36 narrows the candidate set to only those UE's that are idle. If user 10 indicated that UE 16 was in use, then at step 64 BMSN 36 narrows the candidate set to only those UE's that are active. In either case, at step 66 BMSN 36 again determines the number of candidates remaining in the narrowed set. If the number of candidates is within the range that user 10 input as being desired, then step 54 is performed as described above.

If there are still more candidates remaining than desired, then it may be possible to further narrow the candidate set based on commercial information about UE 16, such as its manufacturer, model, color, etc. If user 10 input any such information, and if BMSN 36 is able to obtain information regarding such characteristics from RNC 20, MSC 22 or other source, then at step 70 BMSN 36 narrows the candidates to only those having the input characteristics. At step 72 BMSN 36 determines the number of candidates remaining. If there are still more than candidates remaining than desired, or if user 10 did not input any commercial information, then the search for the identity of UE 16 proceeds to an adjacent sector (i.e., a sector adjacent to the one in which UE 14 is located), as indicated by step 74. The search method is repeated on the new sector as described above, beginning at step 40. If the number of candidates is within the range that user 10 input as being desired, then step 54 is performed as described above. If the search of adjacent sectors still cannot sufficiently narrow the number of candidates, the search can be continued through other network operators (not shown) in the area. Telephone numbers or other information associated with candidates belonging to roaming partner networks can be obtained.

As noted above, the above-described steps by which the candidate set is narrowed are merely exemplary, and others will readily occur to persons skilled in the art. Likewise, the order of the steps shown in FIG. 3 is merely exemplary, and in other embodiments of the invention the candidate set can be narrowed in any other suitable manner using any suitable identification information. Although in the exemplary embodiment, at step 54 the telephone number of the second user's UE 16 is transmitted to the first user's UE 14, in other embodiments the telephone number of the first user's UE 14 can be transmitted to the second user's UE 16. As also noted above, the information that is transmitted is not limited to telephone numbers. In other embodiments any other suitable information associated with the users or their UE's can be transmitted.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for identifying wireless user equipment (UE) possessed by users, comprising:

receiving a request from a first user UE via a wireless telecommunication network, the request including identification information for identifying a second user UE, the identification information including location-based information describing a relative location of the second user UE with respect to the first user UE, the identification information further including a relative speed of the second user UE with respect to the first user UE, the relative speed solicited by the first user UE by displaying a choice of categories including whether the second user UE is carried by a pedestrian or in a vehicle, the identification information further including a state of activity of the second user UE observed by the first user UE, wherein the state of activity comprises whether the second user UE is idle or in use by the second user;

determining a geographic location of the first user UE;

determining geographic locations of a plurality of candidate UE's in response to the identification information; and narrowing the candidate UE's in response to one of a second UE's speed and direction, address or intersection, distance between first UE, state of activity, and commercial information.

2. The method claimed in claim 1, further comprising transmitting information associated with one of the first and second user UE's to the other of the first and second user UE's.

3. The method claimed in claim 2, wherein the information associated with one of the first and second user UE's comprises a telephone number.

4. The method claimed in claim 1, wherein the step of receiving a request from the first user UE comprises receiving menu selections entered by the first user.

5. The method claimed in claim 1, wherein the second UE's speed and direction is with respect to the first UE.

6. The method claimed in claim 1, wherein the commercial information of the second user UE comprises a brand.

7. A blind mobile search node for identifying wireless user equipment (UE) possessed by users, comprising:

logic for processing a request from a first user UE via a wireless telecommunication network, the request including identification information for identifying a second user UE, the identification information including location-based information describing a relative location of the second user UE with respect to the first user UE, the identification information further including a relative speed of the second user UE with respect to the first user UE, the relative speed solicited by the first user UE by displaying a choice of categories including whether the second user UE is carried by a pedestrian or in a vehicle, the identification information further including a state of activity of the second user UE observed by the first user UE, wherein the state of activity comprises whether the second user UE is idle or in use by the second user;

logic for obtaining a geographic location of the first user UE;

logic for computing a geographic location of the second user UE in response to the geographic location of the first user UE and the location-based information;

logic for determining geographic locations of a plurality of candidate UE's in response to the identification information; and logic for narrowing the candidate UE's in response to one of a second UE's speed and direction, address or intersection, distance between first UE, state of activity, and commercial information.

8. The blind mobile search node claimed in claim 7, wherein the logic for identifying the second user UE identifies a telephone number associated with the second user UE.

9. The blind mobile search node claimed in claim 7, further comprising logic for transmitting information associated with one of the first and second user UE's to the other of the first and second user UE's.

10. The blind mobile search node claimed in claim 7, wherein the logic for processing a request receives menu selections entered by the first user.

11. The blind mobile search node claimed in claim 7, wherein the second UE's speed and direction is with respect to the first UE.

12. The blind mobile search node claimed in claim 7, wherein the commercial information of the second user UE comprises a brand.

13. A method for identifying wireless user equipment (UE) possessed by a specific user, comprising:

receiving a request from a first user UE via a wireless telecommunication network, the request including identification information for identifying a second user UE based upon observations of the second user UE, the identification information including location-based information describing a relative location of the second user UE with respect to the first user UE, the identification information further including a relative speed of the second user UE with respect to the first user UE, the relative speed solicited by the first user UE by displaying a choice of categories including whether the second user UE is carried by a pedestrian or in a vehicle, the identification information further including a state of activity of the second user UE observed by the first user UE, wherein the state of activity comprises whether the second user UE is idle or in use by the second user;

determining a geographic location of the first user UE; and identifying the second user UE in response to the geographic location of the first user UE and the location-based information determining geographic locations of a plurality of candidate UE's in response to the identification information; and narrowing the candidate UE's in response to an observation of the second user UE.

* * * * *